United States Patent
Morimoto et al.

(10) Patent No.: US 8,634,404 B2
(45) Date of Patent: Jan. 21, 2014

(54) MOBILE STATION, BASE STATION, MOBILE COMMUNICATION SYSTEM, AND COMMUNICATION METHOD

(75) Inventors: Akihito Morimoto, Yokohama (JP);
Kenichi Higuchi, Yokohama (JP);
Motohiro Tanno, Yokohama (JP);
Mamoru Sawahashi, Yokohama (JP);
Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 698 days.

(21) Appl. No.: 12/064,578

(22) PCT Filed: Aug. 21, 2006

(86) PCT No.: PCT/JP2006/316342
§ 371 (c)(1),
(2), (4) Date: Apr. 10, 2009

(87) PCT Pub. No.: WO2007/023772
PCT Pub. Date: Mar. 1, 2007

(65) Prior Publication Data
US 2009/0247168 A1    Oct. 1, 2009

(30) Foreign Application Priority Data
Aug. 23, 2005  (JP) .................. 2005-241907

(51) Int. Cl.
*H04J 3/06* (2006.01)
*H04B 7/212* (2006.01)

(52) U.S. Cl.
USPC .......................................... 370/350; 370/324

(58) Field of Classification Search
USPC .................. 370/389, 392, 395.4, 458, 508
See application file for complete search history.

(56) References Cited

U.S. PATENT DOCUMENTS

| | | | | |
|---|---|---|---|---|
| 5,410,732 A | * | 4/1995 | Ames et al. | 455/422.1 |
| 6,108,547 A | | 8/2000 | Yamashita et al. | |
| 6,678,523 B1 | * | 1/2004 | Ghosh et al. | 455/442 |
| 2002/0172217 A1 | | 11/2002 | Kadaba et al. | |
| 2004/0218561 A1 | * | 11/2004 | Obuchi et al. | 370/328 |
| 2006/0056355 A1 | * | 3/2006 | Love et al. | 370/332 |
| 2006/0280199 A1 | * | 12/2006 | Lane et al. | 370/458 |

FOREIGN PATENT DOCUMENTS

| | | |
|---|---|---|
| EP | 1507352 A1 | 2/2005 |
| JP | 10-145834 A | 5/1998 |
| JP | 2002-369244 A | 12/2002 |
| JP | 2002-369261 A | 12/2002 |
| JP | 2004-519122 A | 6/2004 |
| TW | 573435 B | 1/2004 |
| TW | 235613 B | 7/2005 |

OTHER PUBLICATIONS

Written Opinion issued in International Application No. PCT/JP2006/316342 mailed Oct. 17, 2006 (Japanese text only), 4 pages.

(Continued)

*Primary Examiner* — Warner Wong
(74) *Attorney, Agent, or Firm* — Sughrue Mion, PLLC

(57) ABSTRACT

A mobile station, a base station, a mobile communication system and a communication method enabling operations associated with simultaneous uplink reception in multiple stations to be simplified are provided. The base station includes a transmission timing determining unit determining a transmission timing based on scheduling conducted upon a data transmission request from a mobile station and notifying the mobile station of the transmission timing, and a receiving unit receiving data in accordance with the transmission timing.

6 Claims, 6 Drawing Sheets

(56) References Cited

OTHER PUBLICATIONS

3GPP TR 25.896 V6.0.0, Mar. 2004, "Feasibility Study for Enhanced Uplink for UTRA FDD", 179 pages.

International Search Report issued in International Application No. PCT/JP2006/316342 mailed Oct. 17, 2006, w/ English translation, 5 pages.

Taiwanese Office Action for Application No. 095130808, mailed on Mar. 11, 2010 (7 pages).

English abstract for Taiwanese Publication No. 235613, publication date Jul. 1, 2005, esp@cenet database, (1 page).

English abstract for Taiwanese Publication No. 573435, publication date Jan. 21, 2004, esp@cenet database, (1 page).

Extended European Search Report for Application No. 06796605.1, mailed on Dec. 13, 2011 (11 pages).

Siemens, "UL Signaling Overhead for Node B Scheduling in SHO", 3GPP TSG-RAN Working Group 1 #38, R1-040968, Prague, Czech Republic, Aug. 16-20, 2004.

\* cited by examiner

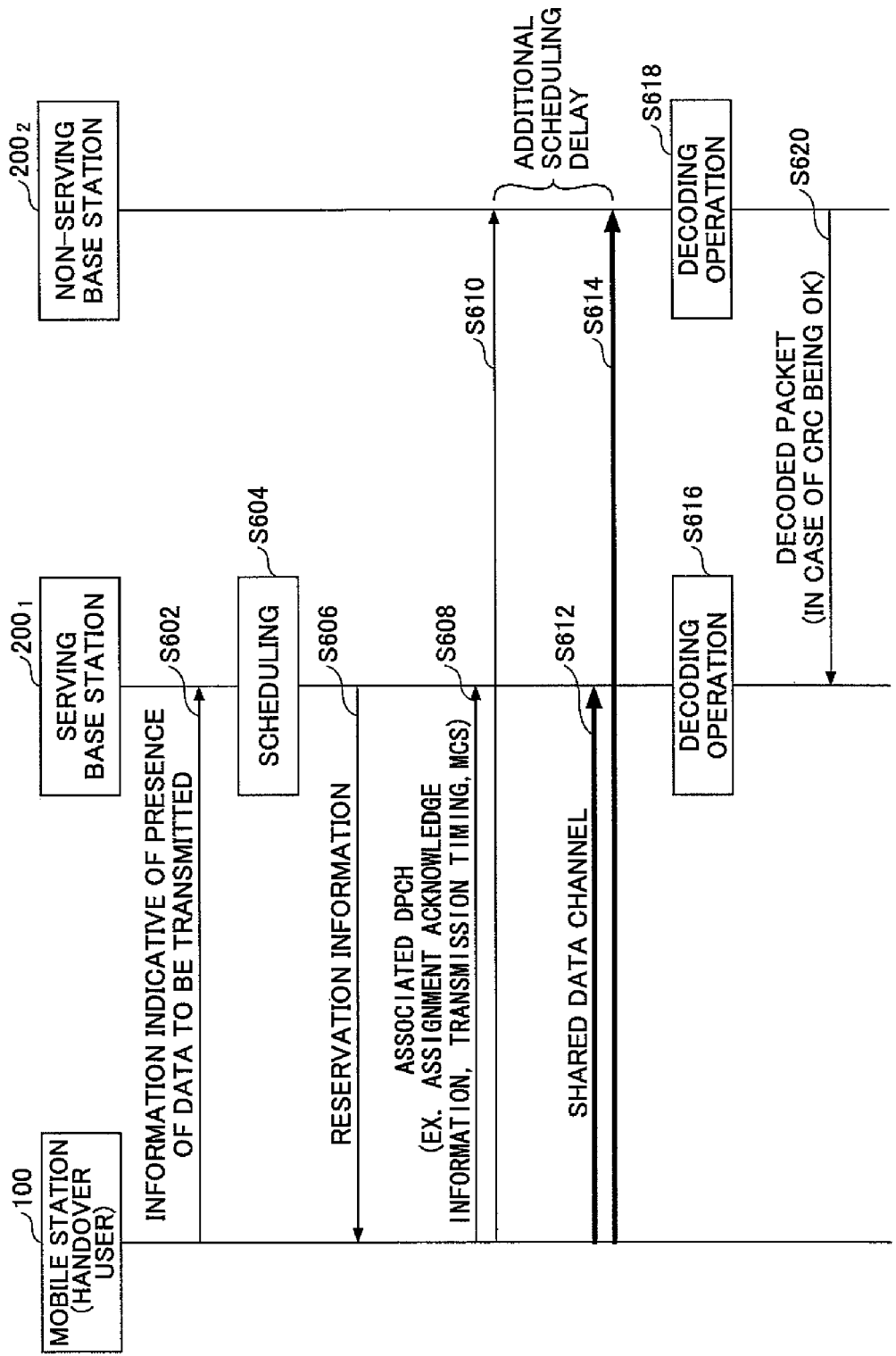

MOBILE STATION, BASE STATION, MOBILE COMMUNICATION SYSTEM, AND COMMUNICATION METHOD

TECHNICAL FIELD

The present invention relates to a mobile station, a base station, a mobile communication system and a communication method.

BACKGROUND ART

The present invention is applicable to radio communication systems for radio packet transmission over an uplink in Evolved UTRA and the fourth generation mobile radio communication scheme.

Among these systems, for example, in Evolved UTRA (UMTS (Universal Mobile Telecommunications System) Terrestrial Radio Access) defined by an international standardization organization (3GPP), improvement of the data rate and the frequency efficiency at cell edges is one important requirement. For the improvement of the data rate and the frequency efficiency at cell edges, macro-diversity is one important technique for packet synthesizing between different base stations (inter-cell) or between different sectors within the same base station.

For example, uplink soft-handover between cells can increase the data rate at cell edges to about 10-15% compared to hard-handover.

For this reason, inter-cell macro-diversity is an effective technique from the viewpoint of improved user throughput at cell edges.

Non-patent document 1: 3PPG TR 25.896

DISCLOSURE OF INVENTION

Problem to be Solved by the Invention

However, the above-mentioned prior art may have some problems as presented below.

For example, as illustrated in FIG. 1, when a mobile station-performs the soft-handover to a serving base station or a primary base station (serving node B) and a non-serving base station or a sub base station (non-serving node B), it must receive downlink signaling channels from multiple cell sites simultaneously. Then, the mobile station controls packet scheduling and HARQ (Hybrid Automatic Repeat request) based on the received downlink signaling channels from the multiple cell sites. In other words, from the viewpoint of the packet scheduling and the HARQ, the downlink signaling channels from the serving base station are indifferent from and are not differentiated from the downlink signaling channels from the non-serving base station. In conventional soft-handover, signaling channels from multiple base stations are all indifferently handled, and the packet scheduling and the HARQ are controlled in such a manner.

In packet transmission, packet related control such as the packet scheduling and the HARQ is carried out by a base station. A mobile station cannot have merits of the handover until it receives the information from multiple base stations and controls the packet scheduling and the HARQ. Thus, the mobile station has to receive two signals simultaneously. Such a condition of simultaneous reception from two base stations is called a soft-handover condition. Here, the mobile station performs the handover if an average reception level difference (path loss difference) from two base stations becomes small enough to fall within a certain threshold. In this case, the base station having the higher average reception level is the serving base station while the base station having the lower average reception level is the non-serving base station. In cases of simultaneous reception from three or more base stations, the base station having the highest average reception level is the serving base station while the other base stations are the non-serving base stations.

In the soft-handover condition, at least two base stations control the scheduling and the HARQ, and the feedback information is transmitted to a mobile station. Thus, the mobile station must receive the feedback information from the at least two base stations.

Also, an associated DPCH (Dedicated Physical Channel) is required to receive the feedback information. Even if there is no transmitted data over a certain time period, the associated DPCH must be transmitted. As a result, a base station must receive a number of associated DPCHs corresponding to W-CDMA simultaneously.

The non-serving base station also assigns data channel transmissions for other handover users. As a result, the serving base station only has to perform data channel demodulation on mobile stations assigned data channel transmissions while the non-serving base station must perform not only the data channel demodulation assigned for mobile stations by the serving base station but also the data channel demodulation assigned for other mobile stations by the non-serving base station itself as the serving base station and thus must receive signals from two users.

Furthermore, since the reception timing may differ depending on the location of the mobile stations, the associated DPCH and a shared data channel must be received at different timings.

As a result, the soft-handover can improve user throughput while the control is complicated.

The present invention is intended to eliminate the above-mentioned problems. One object of the present invention is to provide a mobile station, a base station, a mobile communication system and a communication method for enabling simultaneous reception of multiple stations over the uplink to be simplified.

Means for Solving the Problem

In order to eliminate the above-mentioned problems, according to one embodiment of the present invention, a mobile station includes a data transmission request transmitting unit transmitting a data transmission request; a transmission timing notifying unit notifying a serving base station and a non-serving base station of a transmission timing reported from the serving base station; and a data transmitting unit transmitting data to the serving base station and the non-serving base station based on the transmission timing.

According to this embodiment, the mobile station can notify the serving base station and the non-serving base station of the transmission timing and transmit data in accordance with the transmission timing.

In another embodiment of the present invention, a base station includes a transmission timing determining unit determining a transmission timing based on scheduling conducted upon a data transmission request from a mobile station and notifying the mobile station of the transmission timing; and a receiving unit receiving data from the mobile station in accordance with the transmission timing.

According to this embodiment, it is possible to conduct scheduling for the mobile station, determine the transmission timing and receive data in accordance with the transmission timing.

In another embodiment of the present invention, a base station includes a receiving unit receiving data in accordance with a transmission timing reported from a mobile station; and a packet forwarding unit forwarding decoded data to a serving base station for the mobile station if no error is detected in the data.

According to this embodiment, it is possible to receive data in accordance with the transmission timing reported from the mobile station and forward decoded data to the serving base station for the mobile station if no error is detected in the data. In other words, if an error is detected in the data, the non-serving base station waits.

In another embodiment of the present invention, a mobile communication system includes a serving base station, a non-serving base station and a mobile station conducting handover between the serving base station and the non-serving base station. The mobile station includes a data transmission request transmitting unit issuing a data transmission request; a transmission timing notifying unit notifying the serving base station and the non-serving base station of a transmission timing reported from the serving base station; and a data transmitting unit transmitting data to the serving base station and the non-serving base station based on the transmission timing. The serving base station includes a transmission timing determining unit, upon the data transmission request from the mobile station, conducting scheduling, determining the transmission timing and notifying the mobile station of the transmission timing; and a receiving unit receiving data in accordance with the transmission timing. The non-serving base station includes a receiving unit receiving data in accordance with the transmission timing reported from the mobile station; and a packet forwarding unit forwarding decoded data to the serving base station if no error is detected in the data.

According to this embodiment, the mobile station can notify the serving base station and the non-serving base station of the transmission timing and transmit data in accordance with the transmission timing. Also, the serving base station can conduct scheduling for the mobile station, determine the transmission timing and receive data in accordance with the transmission timing. Also, the non-serving base station can receive data in accordance with the transmission timing reported from the mobile station and forward decoded data to the serving base station for the mobile station if no error is detected in the data.

In another embodiment of the present invention, there is a communication method for use in a mobile communication system including a serving base station, a non-serving base station and a mobile station conducting handover between the serving base station and the non-serving base station, the method including the steps of: at the mobile station, issuing a data transmission request; notifying the serving base station and the non-serving base station of a transmission timing reported from the serving base station; and transmitting data to the serving base station and the non-serving base station based on the transmission timing; at the serving base station, conducting scheduling upon the data transmission request; determining the transmission timing; notifying the mobile station of the transmission timing; and receiving data in accordance with the transmission timing; and at the non-serving base station, receiving data in accordance with the transmission timing reported from the mobile station; detecting an error in the data; and forwarding decoded data to the serving base station if no error is detected in the data.

According to this embodiment, the mobile station can notify the serving base station and the non-serving base station of the transmission timing and transmit data in accordance with the transmission timing. Also, the serving base station can conduct scheduling for the mobile station, determine the transmission timing and receive data in accordance with the transmission timing. Also, the non-serving base station can receive data in accordance with the transmission timing reported from the mobile station and forward decoded data to the serving base station for the mobile station if no error is detected in the data. The mobile station performs some control based on only a signaling channel from the serving base station.

Advantage of the Invention

According to the embodiments of the present invention, it is possible to provide a mobile station, a base station, a mobile communication system and a communication method for enabling simultaneous reception of multiple stations over the uplink to be simplified.

BRIEF DESCRIPTION OF DRAWINGS

FIG. 6 is a sequence diagram illustrating an operation of a mobile communication system according to one embodiment of the present invention.

LIST OF REFERENCE SYMBOLS

10: mobile communication system
100: mobile station
200: base station
200$_1$: serving base station
200$_2$: non-serving base station

BEST MODE FOR CARRYING OUT THE INVENTION

Embodiments of the present invention will be described with reference to the drawings. Throughout the drawings, the same reference symbols may be used for objects having the same function, and iterative descriptions thereof will be omitted.

Figure 1:
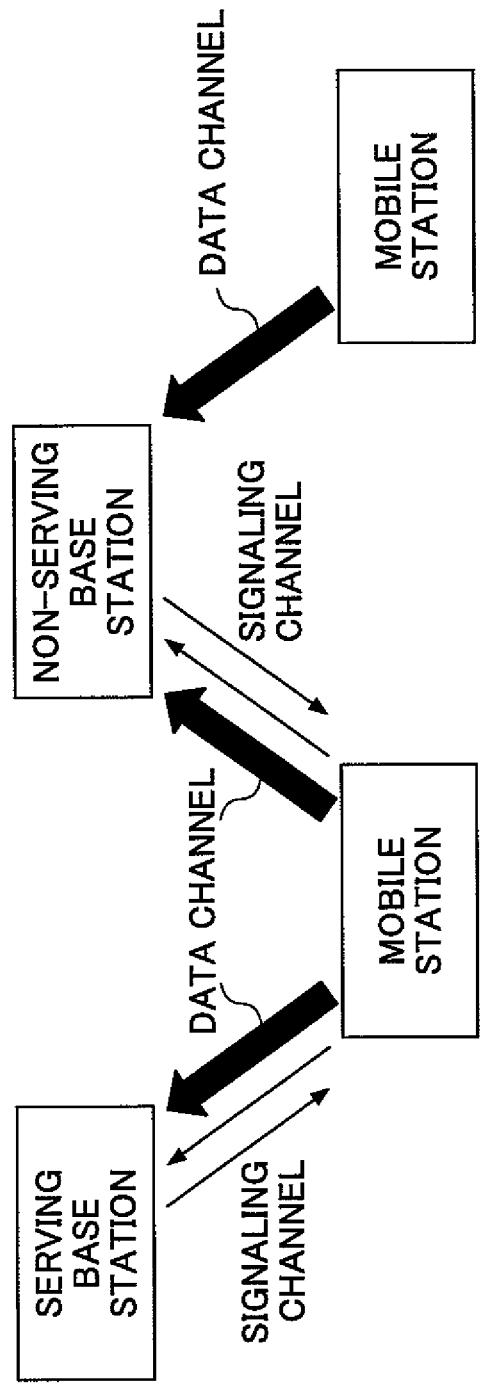
FIG. 1 is a schematic view illustrating a soft-handover condition.
Figure 2:
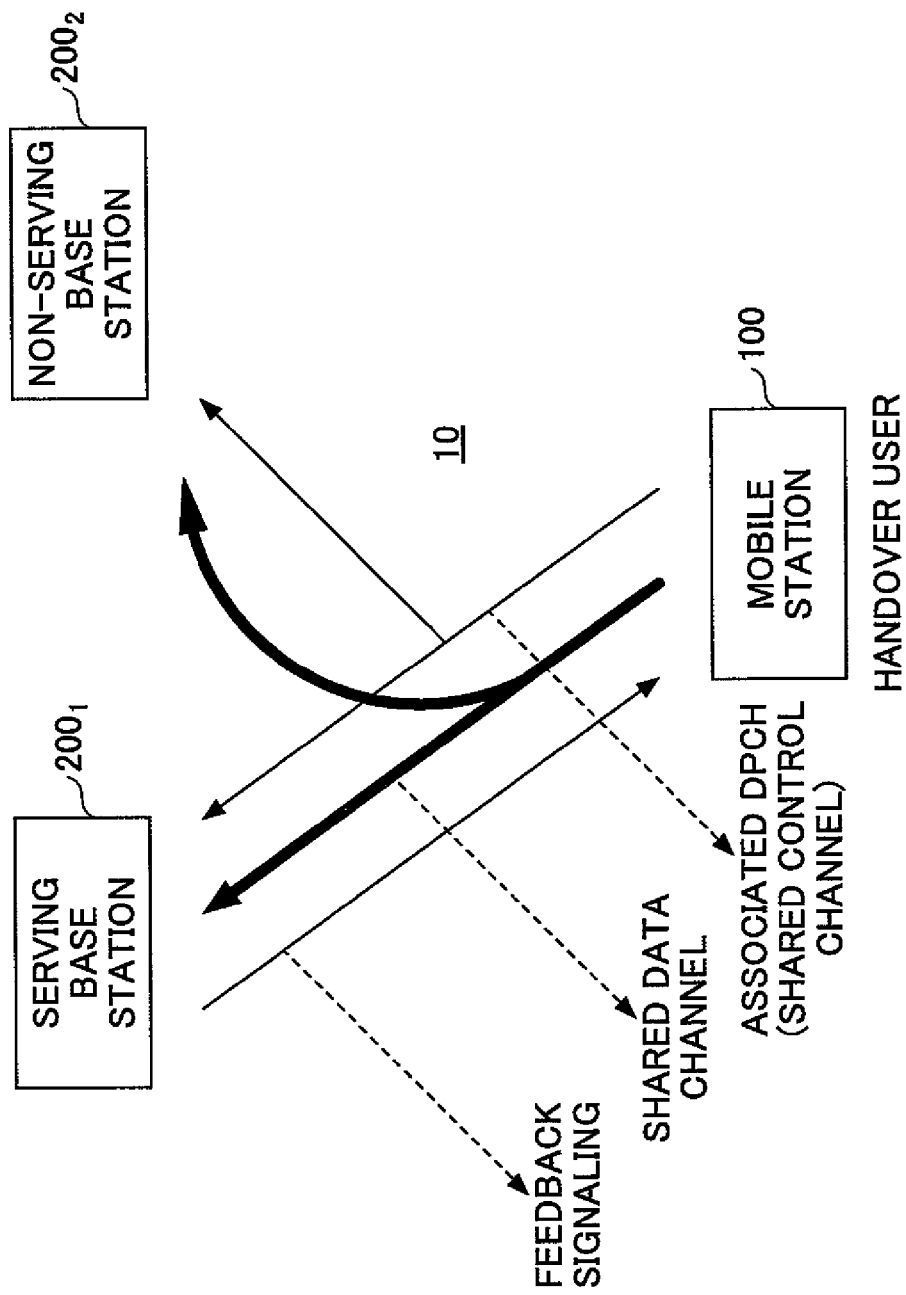
FIG. 2 is a schematic view illustrating a mobile communication system according to one embodiment of the present invention.

A mobile communication system according to an embodiment of the present invention will be described with reference to FIG. 2.

A mobile communication system 10 according to this embodiment includes a mobile station 100 and base stations 200$_1$ and 200$_2$.

In this embodiment, the mobile station 100 is in the soft-handover condition between the serving base station 200$_1$ and the non-serving base station 200$_2$ and can communicate with the serving base station 200$_1$ and the non-serving base station 200$_2$ simultaneously.

In this embodiment, the mobile station 100 performs scheduling control where data channel transmissions are assigned for mobile stations by a single base station, that is, the serving base station 200$_1$, and retransmission control where if a packet is not successfully decoded in the base station, the packet is retransmitted.

When the serving base station 200$_1$ has conducted the scheduling and the user assignment, it notifies the mobile station 100 of a transmission timing indicative of the transmission timing of data and a combination MCS (Modulation and channel Coding Scheme) of the modulation scheme and the channel coding rate as reservation information.

Upon receipt of the reservation information from the serving base station 200$_1$, the mobile station 100 transmits some information such as confirmation information to confirm the assignment, the transmission timing and the MCS to the serving base station 200$_1$ and the non-serving base station 200$_2$ in an associated control channel such as the associated DPCH.

The mobile station 100 transmits data to the serving base station 200$_1$ and the non-serving base station 200$_2$ in a data channel in accordance with the transmission timing.

The non-serving base station 200$_2$ only performs decoding of received packets and reception of HARQ. If the received packet is successfully decoded, the non-serving base station 200$_2$ forwards the packet to the serving base station 200$_1$. If the packet is not successfully decoded, the non-serving base station 200$_2$ temporarily stores it and waits.

The serving base station 200$_1$ performs demodulation and decoding on the received data channel. If the received data channel is not successfully received, the serving base station 200$_1$ temporarily stores it and waits. On the other hand, if the reception is successful from the non-serving base station 200$_2$, the serving base station 200$_1$ determines whether the transmitted packet is received. If the packet is not received from the non-serving base station 200$_2$ during a predetermined time period, the serving base station 200$_1$ requests a retransmission operation by the mobile station of interest. In this case, the serving base station 200$_1$ transmits retransmission request information to the mobile station 100. The terminology "retransmission operation" used herein refers to a series of operations where in response to detection of a decoding error in the decoding of packets in a base station, the base station transmits the retransmission request information to the mobile station and then the mobile station retransmits the same packet to the base station.

In the case where the retransmission is requested, the serving base station 200$_1$ and the non-serving base station 200$_2$ perform the HARQ operation and combine the retransmitted packet with the previously received packet with the decoding error.

In this embodiment, a downlink control channel (feedback signaling) is transmitted from only the serving base station 200$_1$ and is received at the mobile station 100. The non-serving base station 200$_2$ does not transmit the downlink control channel (feedback signaling).

Thus, no control information indicative of the retransmission request is transmitted from the non-serving base station 200$_2$ to the mobile station 100, and the mobile station 100 does not have to receive feedback channels from multiple sites simultaneously. As a result, it is possible to simplify the reception and retransmission control of the downlink control channels.

Figure 3:
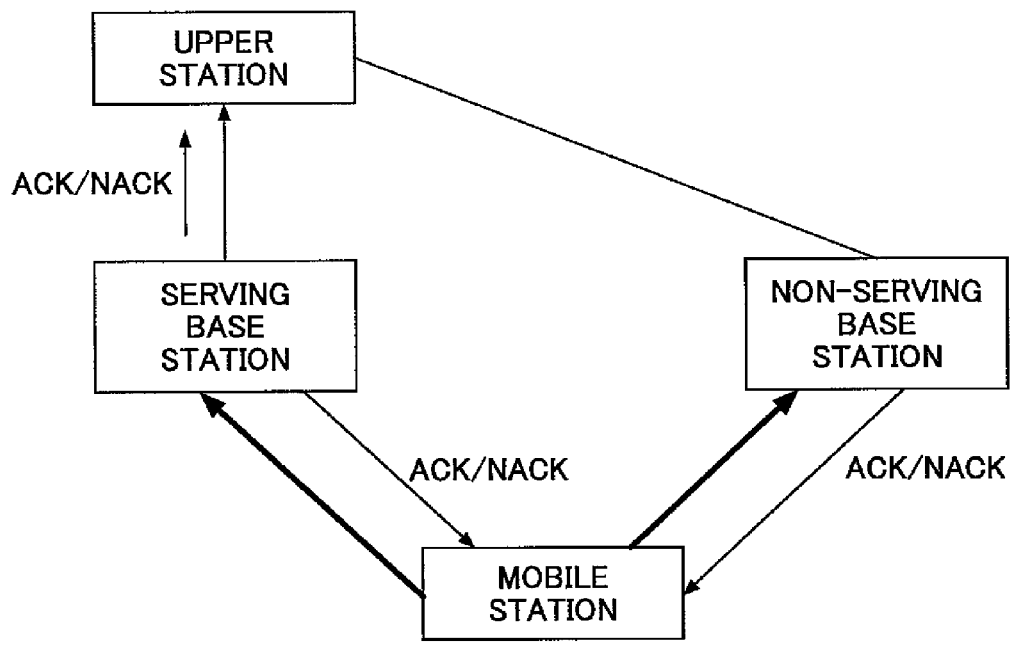
FIG. 3 is a block diagram illustrating an exemplary W-CDMA based mobile communication system.

In the W-CDMA, as illustrated in FIG. 3, some information associated with a transmission acknowledgement signal (ACK) and/or a retransmission request signal (NACK) is transmitted from the both base station, that is, the serving base station and the non-serving base station to the mobile station.

In the W-CDMA, the serving base station performs the scheduling and transmits the assignment information to the mobile station and the non-serving base station. The mobile station transmits a data channel in accordance with the assignment information.

The data channel transmitted from the mobile station is received at both base stations, and both base stations perform demodulation and decoding. If the reception succeeds at either of the base stations, the data channel can be combined at any upper station. As a result, the retransmission operation does not have to be conducted. Only if neither of the base stations successfully receives the data channel, the retransmission operation is conducted. In this case, ACK/NACK information is transmitted from both the base stations to the mobile station.

In this embodiment, on the other hand, no ACK/NACK information is transmitted from the non-serving base station 200$_2$ to the mobile station 100.

Figure 4:
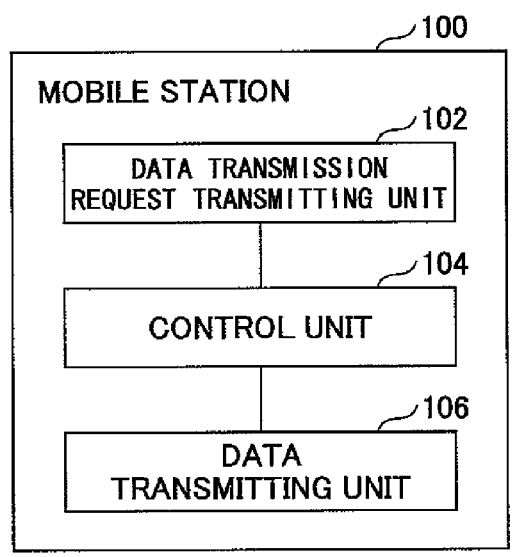
FIG. 4 is a block diagram illustrating a mobile station according to one embodiment of the present invention.

Next, the mobile station 100 according to this embodiment will be described with reference to FIG. 4.

In this embodiment, the mobile station 100 includes a data transmission request transmitting unit 102, a control unit 104 coupled to the data transmission request transmitting unit 102 and serving as a transmission timing reporting unit, and a data transmitting unit 106 coupled to the control unit 104.

Upon occurrence of transmitted data, the data transmission request transmitting unit 102 transmits a data transmission request to the serving base station 200$_1$.

The control unit 104 reports a transmission timing received from the serving base station 200$_1$ to the serving base station 200$_1$ and the non-serving base station 200$_2$.

The data transmitting unit 106 transmits the data to the serving base station 200$_1$ and the non-serving base station 200$_2$ based on the transmission timing received from the serving base station 200$_1$.

Figure 5A:
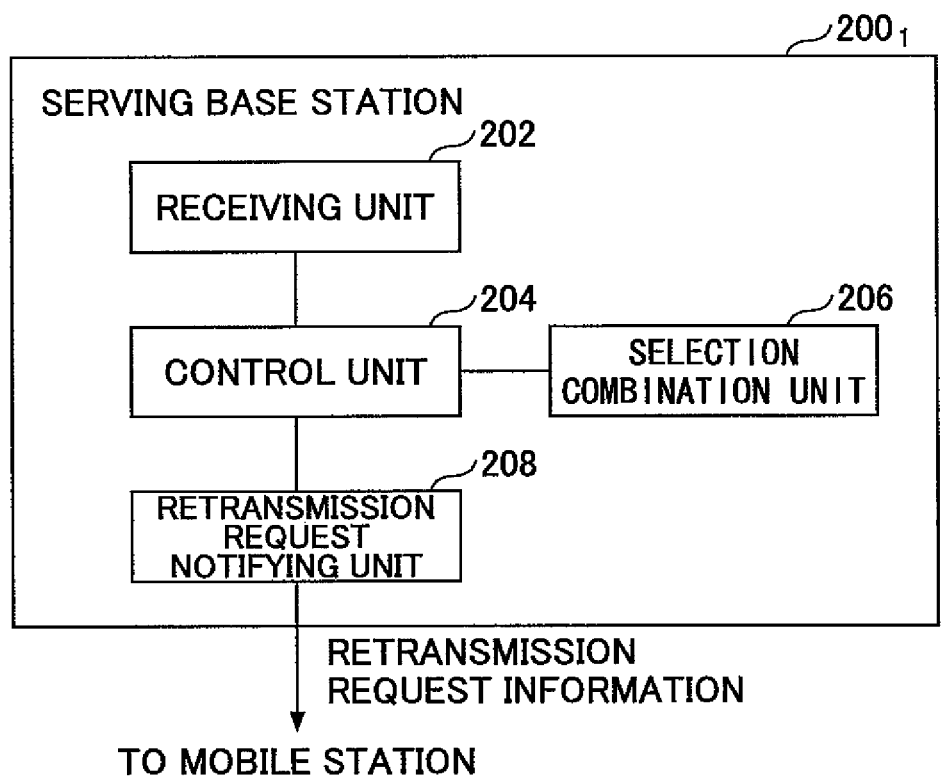
FIG. 5A is a block diagram illustrating a serving base station according to one embodiment of the present invention.
Figure 5B:
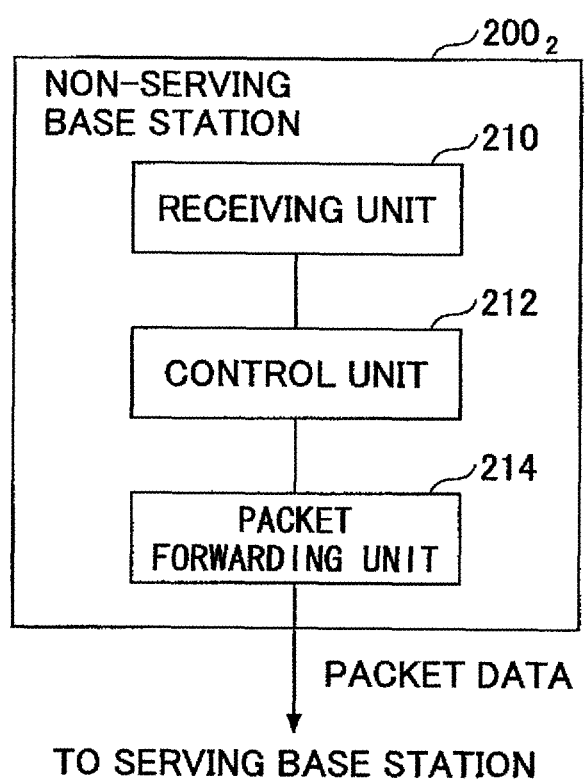
FIG. 5B is a block diagram illustrating a non-serving base station according to one embodiment of the present invention.

Next, the base station 200 according to this embodiment will be described with reference to FIGS. 5A and 5B.

In this embodiment, although the base station 200 will be described by dividing it into the serving base station 200$_1$ and the non-serving base station 200$_2$, the base station 200 includes both functions.

The serving base station 200$_1$ includes a receiving unit 202, a control unit 204 coupled to the receiving unit 202, a selection combination unit 206 coupled to the control unit 204 and a retransmission request reporting unit 208.

The receiving unit 202 performs demodulation and decoding on received packets and conducts error detection. Also, if a retransmitted packet is received, the receiving unit 202 combines the retransmitted and original packets.

If the packet received at the receiving unit 202 includes some error, the control unit 204 waits during a predetermined time period to determine whether a successfully received packet frame or IP packet is forwarded from the non-serving base station. If a successfully received packet frame or IP packet is not forwarded from the non-serving base station 200$_2$ within the predetermined time period, the control unit 204 determines that the packet has not been successfully received at the non-serving base station 200$_2$ as well and instructs the retransmission request reporting unit 208 to issue a retransmission request. The predetermined time period is determined in advance based on the distance between the serving base station 200$_1$ and the non-serving base station 200$_2$, the transfer rate and processing delay. For example, as the packets are routed via a greater number of upper stations, the processing delay may increase. In other words, the predetermined time period is determined based on the path condition.

The retransmission request reporting unit 208 transmits the retransmission request to the mobile station 100 in accordance with the instruction from the control unit 204.

Upon receipt of the packet from or IP packet transmitted from the non-serving base station $200_2$, the selection combination unit 206 performs selection combination on the packet. If the decoded packet frame or IP packet is received, the selection combination unit 206 performs the selection combination.

The non-serving base station $200_2$ includes a receiving unit 210, a control unit 212 coupled to the receiving unit 210, and a packet forwarding unit 214 coupled to the control unit 212.

The receiving unit 210 performs demodulation and decoding on packets transmitted from the mobile station 100 and conducts error detection. Also, if a retransmitted packet is received, the receiving unit 210 combines the packets.

The control unit 212 waits if the packet received at the receiving unit 210 includes an error, and on the other hand, forwards the packet in units of packet frames or IP packets to the serving base station $200_1$ via the packet forwarding unit 214 if the packet includes no error and thus can be successfully demodulated and decoded.

The packet forwarding unit 214 uses a Layer 2 (L2) address such as a MAC (Medium Access Control) address or a Layer 3 (L3) address such as an IP address to forward the successfully demodulated and decoded packet frame or packet frames in units of concatenated IP packets to the serving base station $200_1$ via a wired transmission channel or a backhaul. The packet forwarding unit 214 may forward it to the serving base station $200_1$ directly, or may forward it via an upper station.

Next, an exemplary operation of a mobile communication system according to this embodiment will be described with reference to FIG. 6.

It is assumed that the serving base station $200_1$ and the non-serving base station $200_2$ have been already determined for the mobile station 100.

The data transmission request transmitting unit 102 of the mobile station 100 transmits some information indicative of the presence of some data to be transmitted to the serving base station $200_1$ (step S602).

The serving base station $200_1$ performs scheduling in the control unit 204 (step S604). In the case where a handover user is assigned, the serving base station $200_1$ transmits reservation information to the handover user (step S606). The reservation information may include assignment information indicating that a handover user has been assigned such as an assigned time slot and frequency information, a transmission timing indicative of a timing for transmitting a shared data channel, MCS and others. In this manner, the mobile station can know that it has been assigned.

Upon receipt of the reservation information, the mobile station 100 transmits some information including acknowledge information for acknowledging that it has been assigned, the transmission timing, the MCS and others to the serving base station $200_1$ and the non-serving base station $200_2$ in an associated control channel such as an associated DPCH (steps S608, S610). Since the transmission timing is reported in this manner before the transmission of shared data channels, the non-serving base station $200_2$ can recognize the reception timing of the shared data channel of the handover user and MCS information in advance. This is one feature of the present invention. Also, in this case, additional scheduling delay is acceptable to the mobile station 100 (handover user).

In the non-serving base station $200_2$, the associated DPCH must be received to receive a shared data channel. For example, a common associated physical channel may be used as the associated DPCH. This common associated physical channel is shared among handover users and is used commonly among the users. The common associated physical channel may be commonly used in a collection of dedicated channels.

The users may be multiplexed in any one of several methods, for example, time multiplexing where the users are switched for individual subframes or packets, frequency multiplexing where the users are multiplexed in frequency areas, and code multiplexing where the multiple users can be accepted by using different codes.

Also, the associated DPCH may be used. If the associated DPCH is used, a dedicated channel or a common channel may be used.

The use of the dedicated channel has an advantage that the assigned user can be assured of using it. On the other hand, the use of the common channel has an advantage that a greater number of users can be accepted.

If a common channel is used and a transmission scheme similar to frequency diversity is adopted, all users can enjoy some reasonable reception quality. Also, the reception quality can be improved by controlling the transmission power.

As the multiplexing scheme among common channels, the above-mentioned time multiplexing, frequency multiplexing or code multiplexing may be used.

The mobile station 100 transmits data in a shared data channel in accordance with the transmission timing (steps S612, S614). The transmitted data are received at the serving base station $200_1$ and the non-serving base station $200_2$.

The serving base station $200_1$ and the non-serving base station $200_2$ decode received packets (steps S616, S618).

The non-serving base station $200_2$, if the packets have been successfully demodulated and decoded, forwards the decoded packet frame or concatenated IP packets to the serving base station $200_1$. It is one feature of the present invention to forward the packet frame or IP packets successfully decoded at the non-serving base station to the serving base station as mentioned above.

The non-serving base station $200_2$, if the packets have not been successfully decoded, takes no action.

On the other hand, the serving base station $200_1$, if the packets have not been successfully decoded, waits for the non-serving base station $200_2$ to forward the successfully received packet frame or concatenated IP packets. The serving base station $200_1$, if the successfully received packet frame or concatenated IP packets are not forwarded during a predetermined time period, determines that the non-serving base station $200_2$ also failed to receive the packets and initiates the retransmission control.

Also, the non-serving base station $200_2$, if the packets have not been successfully received may notify the serving base station $200_1$ with some information indicating that the packets have not been successfully received. In this manner, the serving base station $200_1$ can initiate the retransmission control rapidly based on a packet reception result of the serving base station $200_1$ itself.

According to this embodiment, the packet scheduling can be conducted only between the mobile station and the serving base station. As a result, the non-serving base station only has to decode a shared data channel and does not have to transmit feedback information to the mobile station. In this case, the non-serving base station may be notified of MCS information and the reception timing of the shared data channel from the mobile station via a control channel such as an associated DPCH in advance.

In the non-serving base station $200_2$, in order to reduce the number of common data channels and the associated DPCHs, UE (User Equipment) ID indicative of a transmitting user, the transmission timing and the MCS information may be received in a common associated physical channel in advance. For example, the control unit 104 reports the transmission timing and the UE ID via a control channel commonly used among multiple mobile stations. Since the UE ID is included, the corresponding user can be identified at the non-serving base station $200_2$ even when the control channel is commonly used among multiple users.

The non-serving base station $200_2$ receives and decodes a successive shared data channel (packet composite type HARQ at retransmission). Then, if no error is detected in CRC (Cyclic Redundancy Check), the non-serving base station $200_2$ forwards the decoded packet. For example, the non-serving base station $200_2$ may use a L2 address or a L3 address to forward the decoded packet to the serving base station $200_1$. Since the shared data channel is associated with packet mode transmission rather than circuit switching, the non-serving base station $200_2$ does not have to have so many receiving cards such as boards.

According to this embodiment, the handover that can obtain macro-diversity gain equivalent to the soft-handover without simultaneous reception of feedback channels from multiple sites is achievable. In addition, a best effort type complementary HHO in the uplink can be achieved.

INDUSTRIAL APPLICABILITY

The mobile station, the base station, the mobile communication system and the communication method according to the present invention can be applied to mobile communication systems.

This international patent application is based on Japanese Priority Application No. 2005-241907 filed on Aug. 23, 2005, the entire contents of which are hereby incorporated by reference.

The invention claimed is:

1. A base station comprising:
a transmission timing determining unit determining a transmission timing of a data channel based on scheduling conducted upon a data transmission request from a mobile station;
a transmission timing notifying unit notifying the mobile station of the determined transmission timing;
a receiving unit receiving the data channel from the mobile station in accordance with the transmission timing; and
a retransmission request notifying unit transmitting a retransmission request signal for the data channel to the mobile station,
wherein when the base station has failed to decode the received data channel, the receiving unit waits to receive the data channel forwarded from a non-serving base station of the mobile station for a predefined time period, the data channel transmitted to the base station and the non-serving base station at the transmission timing determined based on the scheduling conducted upon the data transmission request from the mobile station, and if the receiving unit has not received the data channel from the non-serving base station for the predefined time period, the retransmission request notifying unit transmits the retransmission request signal to the mobile station.

2. The base station as claimed in claim 1, further comprising:
a selection combination unit selectively combining the data channel forwarded from the non-serving base station.

3. The base station as claimed in claim 2,
wherein the retransmission request notifying unit issues a retransmission request to the mobile station if an error is detected in the received data channel and the data channel is not forwarded from the non-serving base station.

4. A mobile communication system including a serving base station, a non-serving base station and a mobile station conducting handover between the serving base station and the non-serving base station,
the mobile station comprising:
a data transmission request transmitting unit issuing a data transmission request for a data channel to the serving base station;
a receiving unit receiving a transmission timing of the data channel indicated from the serving base station;
a transmission timing notifying unit notifying the serving base station and the non-serving base station of the received transmission timing;
a data transmitting unit transmitting the data channel to the serving base station and the non-serving base station in accordance with the received transmission timing; and
a retransmission unit retransmitting the data channel in response to reception of a retransmission request signal for the data channel at the receiving unit from the serving base station,
wherein when the non-serving base station determines that the data channel has not been successfully decoded, the serving base station transmits the retransmission request signal to the mobile station,
the serving base station comprising:
a transmission timing determining unit determining the transmission timing based on scheduling conducted upon the data transmission request from the mobile station;
a transmission timing notifying unit notifying the mobile station of the determined transmission timing;
a receiving unit receiving the data channel from the mobile station in accordance with the determined transmission timing; and
a retransmission request notifying unit transmitting a retransmission request signal for the data channel to the mobile station, wherein when the serving base station has failed to decode the received data channel, the receiving unit waits to receive the data channel forwarded from the non-serving base station of the mobile station for a predefined time period, the data channel transmitted to the serving base station and the non-serving base station at the transmission timing determined based on the scheduling conducted upon the data transmission request from the mobile station, and if the receiving unit has not received the data channel from the non-serving base station for the predefined time period, the retransmission request notifying unit transmits the retransmission request signal to the mobile station,
the non-serving base station comprising:
a receiving unit receiving the data channel in accordance with the transmission timing reported from the mobile station; and
a packet forwarding unit decoding the data channel and forwarding the decoded data channel to the serving base station if no error is detected in the data.

5. A communication method for use in a mobile communication system including a serving base station, a non-serving base station and a mobile station conducting handover between the serving base station and the non-serving base station, the method comprising the steps of:

at the mobile station,
issuing a data transmission request for a data channel to the serving base station;
receiving a transmission timing of the data channel indicated from the serving base station;
notifying the serving base station and the non-serving base station of the received transmission timing;
transmitting the data channel to the serving base station and the non-serving base station in accordance with the received transmission timing;
receiving a retransmission request signal for the data channel from the serving base station when the non-serving base station determines that the data channel has not been successfully decoded; and
retransmitting the data channel in accordance with the received retransmission request signal, at the serving base station,
conducting scheduling upon receiving the data transmission request from the mobile station;
determining the transmission timing based on the scheduling;
notifying the mobile station of the determined transmission timing;
receiving the data channel from the mobile station in accordance with the determined transmission timing; and
transmitting the retransmission request signal to the mobile station, wherein the transmitting comprises, when the serving base station has failed to decode the received data channel, waiting to receive the data channel forwarded from a non-serving base station of the mobile station for a predefined time period, the data channel transmitted to the base station and the non-serving base station at the transmission timing determined based on the scheduling conducted upon the data transmission request from the mobile station, and if the data channel has not been received from the non-serving base station for the predefined time period, transmitting the retransmission request signal to the mobile station, at the non-serving base station,
receiving the data channel in accordance with the transmission timing reported from the mobile station;
performing error detection on the data channel; and
decoding the data channel and forwarding the decoded data channel to the serving base station if no error is detected in the data channel.

6. The method as claimed in claim 5, further comprising the steps of: at the serving base station, receiving the data channel forwarded from the non-serving base station; and selectively combining the received data channel.

* * * * *